United States Patent [19]

Huggins

[11] Patent Number: 4,810,228

[45] Date of Patent: Mar. 7, 1989

[54] NOISE GENERATING CLAPPER

[75] Inventor: Peter D. Huggins, Ashtabula, Ohio

[73] Assignee: Iten Industries, Ashtabula, Ohio

[21] Appl. No.: 69,872

[22] Filed: Jul. 6, 1987

[51] Int. Cl.⁴ .......................... A63H 5/00; E05D 5/00; G10D 13/08; A01K 15/00

[52] U.S. Cl. .................................... 446/418; 446/421; 16/385; 84/402; 273/84 R; 119/29

[58] Field of Search ............... 446/418, 421, 419, 420, 446/422, 404, 405, 397, 113, 112, 115, 116, 120, 122; 16/385, 355, 269, 225, 260, 268; 84/402 C, 402, 402 R; 273/84 R, 67 R; 231/2.1; 119/29

[56] References Cited

U.S. PATENT DOCUMENTS

| | | | |
|---|---|---|---|
| 1,438,304 | 12/1922 | Goldberg et al. | 446/418 |
| 2,012,800 | 8/1935 | Allen | 16/385 X |
| 2,678,158 | 5/1954 | Arant | 446/421 X |
| 3,157,000 | 11/1964 | Stavig | 446/418 |
| 3,444,772 | 5/1969 | Martin | 446/421 X |
| 3,451,096 | 6/1969 | Leshin | 16/260 |
| 3,928,890 | 12/1975 | Baker | 16/255 X |
| 3,990,177 | 11/1976 | Daraux | 446/418 |
| 4,019,277 | 4/1977 | Kenkelen | 446/418 X |
| 4,123,822 | 11/1978 | Bentley | 16/355 |
| 4,170,082 | 10/1979 | Freedman | 446/115 X |

FOREIGN PATENT DOCUMENTS

| | | | |
|---|---|---|---|
| 3223806 | 1/1982 | Fed. Rep. of Germany | 446/120 |

*Primary Examiner*—Robert A. Hafer
*Assistant Examiner*—D. Neal Muir
*Attorney, Agent, or Firm*—J. Helen Slough

[57] ABSTRACT

A noise generating device which has a pair of plastic elongated blades pivotally secured at their distal ends to each other and interconnected intermediately. A spacer is interposed between the blades between the distal and interconnected intermediate portions of the blades. The clapper being used by an operator grasping the ends of the blades and shaking the blades to produce a clapping sound. An improved method of producing the device.

8 Claims, 2 Drawing Sheets

NOISE GENERATING CLAPPER

BACKGROUND OF THE INVENTION

This invention pertains to a noise maker device useful for generating a clapping sound at public gatherings such as sporting events, and more particularly to a mechanical clapper operative to create a simulated clapping noise.

Noise actuating devices are known for generating hand operated clapping noises. For instance, U.S. Pat. No. 3,909,977 discloses a noise making clapper comprising a plurality of elongated flexible blades adapted to clap together to produce a clapping noise. U.S. Pat. No. 3,157,000 discloses a noise making paddle where a pair of elongated blades create a clapping noise by clapping one blade against the other blade. A noisemaker operative by clapping one or two pivotally mounted outside paddles against a stationary center paddle is shown in U.S. Pat. No. 4,463,517. Further, U.S. Pat. No. 4,019,277 discloses a combined fan and noisemaker comprising two outer blades adapted to strike a center blade. The various prior art structures, however, are deficient in structure as well as effectiveness in generating clapping noises.

It now has been found that a noise generating clapper device preferably comprising two identically molded plastic elongated blades can be snapped together at one distal end and further interconnected at an intermediate point to provide a laterally connection between the two blades. The clapper can be hand actuated to generate a clapping noise by clapping together the clapping ends of the clapper. The clapper includes an intermediate space between the blades to physically separate and laterally space the blades progressively apart as the linear distance increases from the distal connection between the blades. The construction of the clapper device advantageously provides a comfortable gripping or hand grasping of the clapper between the distal connection and the intermediate spacing means without encumbering the rapid reciprocating motion of the blades clapping together. The improved clapping noise is mainly created due to improved air displacement between the clapping ends as well as the rapid physical collision between the clapping ends. Intensity of the clapping sound can be advantageously optimized by maintaining proper spacing between the clapper ends while maintaining a proper linear distance between the distal end connection of the blades and the intermediate spacing means between the blades to maintain a proper a lateral displacement between the blades in the hand-gripping section of the clapper. The amplitude and frequency of the clapping can be varied by controlling the stiffness of the blade as well as the linear length of the blades. The clapper of this invention can be expediently produced by injection molding of two identical blades adapted to be complementary fits upon interconnecting one blade with a second blade. The blades are adapted to be easily assembled by interlocking connecting means at the distal end of the blades and interconnecting the blades intermediately while maintaining a lateral spacing between the blades with an intermediate spacing means. These and other advantages of this invention will become more apparent by referring to the drawings and detailed description of the invention.

SUMMARY OF THE INVENTION

Briefly, the noise generating clapper of this invention comprises two molded blades interconnected in a laterally spaced relationship and operative to create a clapping noise. The clapper comprises two blades pivotally interconnected at the distal end of each blade to orientate one blade facing the other blade, further interconnected intermediately by an intermediate connection means, in conjunction with an intermediate spacing means to assure lateral spacing between the blades in the gripping section of the clapper. An effective clapping noise is generated by clapping together the opposed laterally spaced clapping ends of the respective blades.

The clapper can be easily assembled by providing identically molded blades having complementary interconnecting structures to enable interconnection between the two blades at the distal end and at the intermediate section to provide a laterally spaced disposition of the blades in conjunction with the intermediate spacing means. Accordingly, the blades can be easily and efficiently snapped together for use as a noise generating clapper.

IN THE DRAWINGS

DETAILED DESCRIPTION OF THE INVENTION

Figure 1:
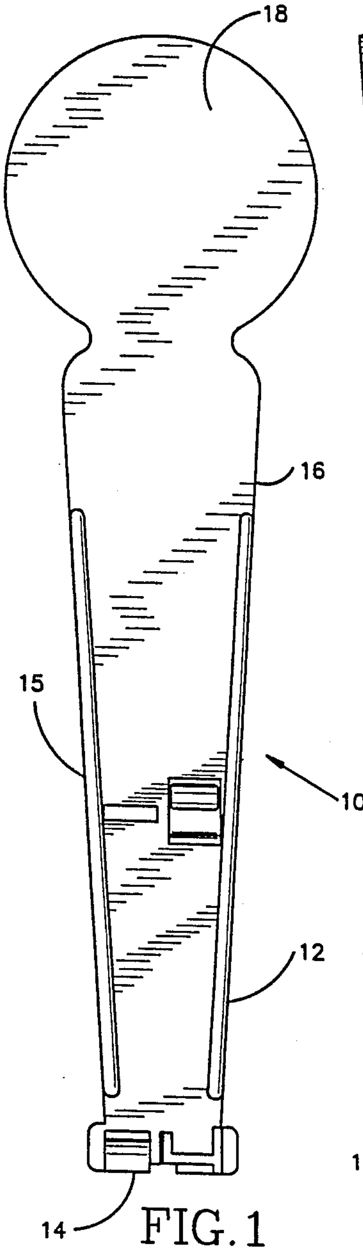
FIG. 1 is a front elevational view of the clapper of this invention.
Figure 2:
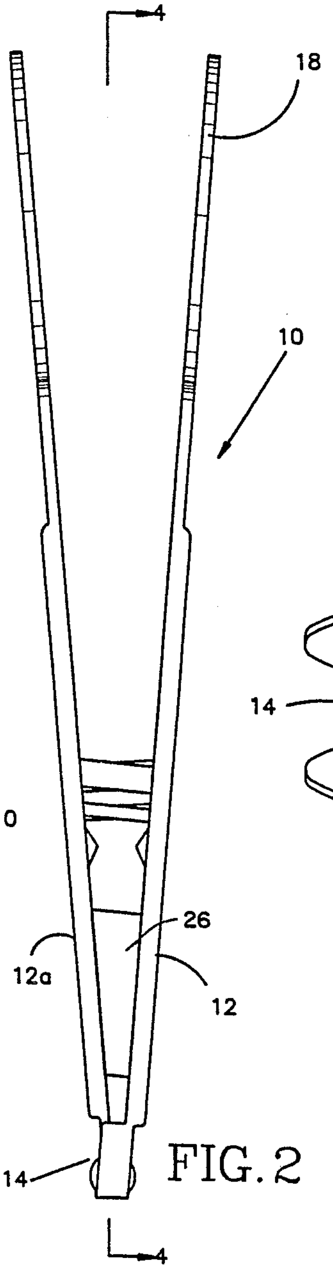
FIG. 2 is a side elevational view of the clapper shown in FIG. 1.

Referring to the drawings wherein like reference characters designated like parts, shown generally in FIG. 1 and FIG. 2 is a noise generating clapper 10 of this invention comprising a pair of flat clapper blades 12, **12*a* pivotally interconnected at a distal connection 14. Although not shown specifically in the drawings, the subscript "a" will designate the identical structure but differentiate between the first clapper blade 12 and the second clapper blade 12*a***.

Figure 5:
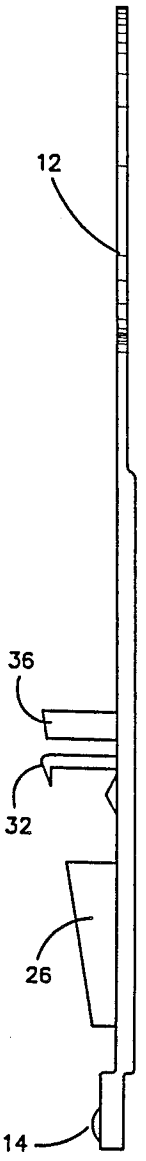
FIG. 5 is a side elevational view of the clapper blade shown in FIG. 4.
Figure 6:
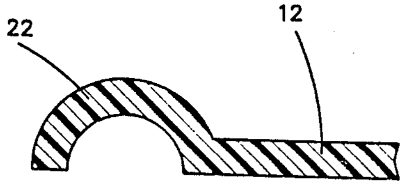
FIG. 6 is a partial sectional view taken along lines 6—6 in FIG. 4.
Figure 9:
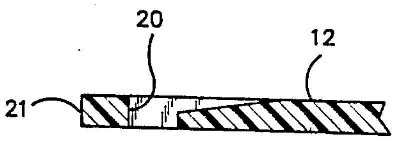
FIG. 9 is a partial sectional view taken along lines 9—9 in FIG. 4.

The clapper blades 12 each comprise in a linear direction from the distal end 14 an intermediate section 16 and an enlarged clapping end 18. As best viewed in FIG. 4 and FIG. 5, each clapper blade 12 contains a distal connection means comprising a rectangular distal opening 20 within the distal end and partially defined by a structural member 21 which is adjacently spaced from a hook connecting means 22 where the hook connector 22 of the first blade 12 is adapted to interconnect with the distal opening **20*a* in the second blade 12*a* while the hook connector 22*a* of the second blade 12*a* similarly interconnects with the distal opening 20 in the first blade 12. A linear slot 24** located between the distal opening 20 and the adjacent hook connector 22 is provided to facilitate interconnecting of the respective distal ends of the first and second clapper blades 12, 12*a*. It can be readily seen that slots 24 and 24*a* in the first and second clapper blades 12 and 12*a* afford means whereby the distal connecting ends of blades 12 and 12*a* can be rotated slightly to interconnect hook 22 with distal opening 20*a* and interconnect hook 22*a* with distal opening 20 to provide a distal connection 14 between clapper blades 12 and 12*a* while orientating the blades 12, 12*a* in opposed face-to-face laterally spaced relationship. An enlarged view of the distal opening 20 in the distal end of blade 12 is shown in FIG. 9 while an enlarged view of the hook connecting means 22 is shown in FIG. 6.

The intermediate section 16 of the clapper blade preferably includes a linearly directed narrow spacer tapered shoulder 26 of which the height increases slightly with increasing linear distance from the distal pivotal connection 14 to maintain progressively increased spacing between the intermediate sections 16, 16*a* of the blades 12, 12*a*. The intermediate shoulder spacer 26 is best viewed in FIG. 4 and FIG. 5.

Figure 4:
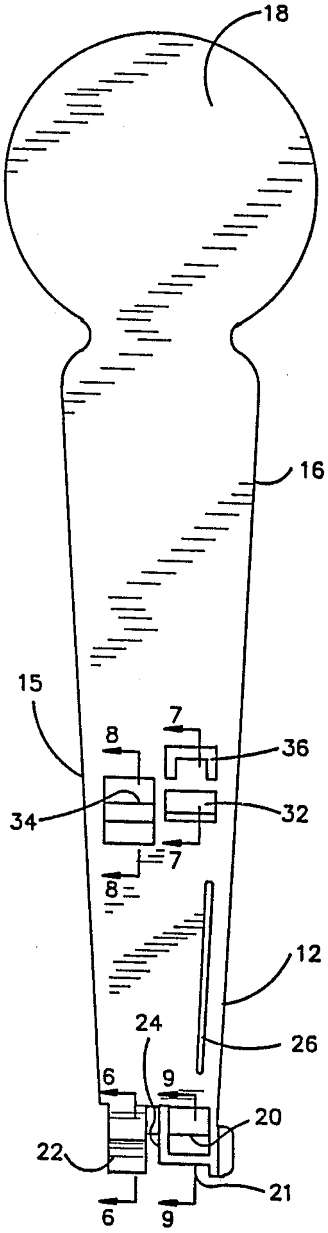
FIG. 4 is an inside elevational view of one of the clapper blades and taken along lines 4—4 in FIG. 2.
Figure 7:
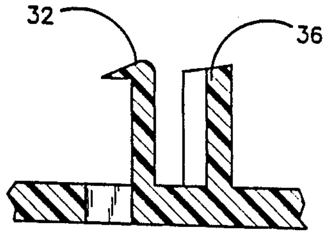
FIG. 7 is a partial sectional view taken along lines 7—7 in FIG. 4.
Figure 8:
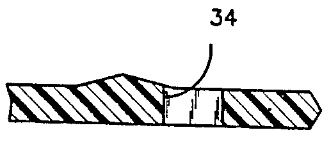
FIG. 8 is a partial sectional view taken along lines 8—8 in FIG. 4.

Referring now to FIG. 7 and FIG. 8 in conjunction with FIG. 4 shown is an intermediate connecting means comprising an inverted L-shaped connector 32 and an adjacent intermediate opening 34. It is readily seen that an intermediate connection between clapper blades 12 and 12*a* can be readily achieved by snapping L-shaped connector 32 within opposed intermediate opening 34*a* in blade 12*a* while snapping L-shaped connector 32*a* within opposed intermediate opening 34 disposed within clapper blade 12. The intermediate connection means 32 in conjunction with a linearly adjacent U-shaped intermediate spacing means 36 maintain a laterally spaced relationship between the clapper blades 12 and 12*a*, and acts as a fulcrom for the blades.

The intermediate section of the clapper 10 provides a hand gripping section 15 generally located linearly between the distal connecting means 14 and the intermediate spacing means 36. It is readily seen that the intermediate spacing means 36 maintains spacing between respective clapper blades 12,12*a* in the gripping section by merely engaging the inside surface of the other clapper blade. In this regard, the intermediate spacer 36 maintains a minimum distance between clapper blades 12,12*a* while the intermediate L-shaped connector 32 prevents excessive spacing between clapper blades 12 and 12*a*. Excessive spacing is prevented by the L-shaped member 32 engaging the outside surface of the opposed clapper blade 12*a* while passing through the intermediate opening 34*a*. Accordingly, the intermediate spacing member 36 in conjunction with the intermediate conjunction with the intermediate engaging member 32 effectively maintains a variable spacing between clapper blades 121 and 12*a* and yet maintains lateral movements between very close maximum and minimum lateral spacing between the clapper blades 12 and 12*a* in the gripping section 15 of the clapper 10. The slight lateral movement of the blades 12 and 12*a* permitting in the gripping section 15 by the engaging connector means 32 and the intermediate spacing means 36 increases the amplitude of the reciprocating blades 12 and 12*a* in use by utilizing the entire length of the blades. It is readily seen that the intermediate spacer 36 enables a sturdy grip on the clapper 10 in use without interfering with the lateral movement of the blades.

The various dimensions and distances can be varied as desired although it should be noted that the linear distance between the distal connection 14 and the intermediate spacing means 36 advantageously permits the hand to grasp the clapper 10 in the gripping section 15 without encumbering the clapping motion of the blades 12 and 12*a* in use. The progressive spacing between the blades 12 and 12*a* with increasing linear distance from the distal connection 14 due to shoulders 26 enables a sturdy grip but avoids interference with the clapping action of the respective blades 12 and 12*a*. The clapping sound or noise varies as the lateral distance between clapper ends 18 and 18*a* varies. In this regard, if spacing between blades 12 and 12*a* is too small, then the sound can be significantly altered and diminished. On the other hand, if the lateral distance between adjacent blades 12 and 12*a* is too large, the ease of gripping the clapper 10 and maintaining desirable clapping action are compromised. It is believed that the clapping noise is efficiently and effectively generated as a result of air displacement between the blades 12 and 12*a*. The amplitude and frequency of the clapping noise typically will vary with the stiffness of the plastic blade material as well as the length of the blades 12 and 12*a*.

As noted above, clapper blades 12 and 12*a* are identically molded parts and can be advantageously produced by injection molding of plastic materials. The distal pivotal connection 14 and intermediate connecting means are structurally designed to provide complementary interconnection of identical clapper blades 12 and 12*a*. Injection molding is highly desirable for minimizing cost and ease of manufacture although other molding process are acceptable. Suitable useful plastic materials can include polyethylene, polypropylene, polyvinyl chloride, and polystyrene, or similar thermoplastic polymeric compositions.

Figure 3:
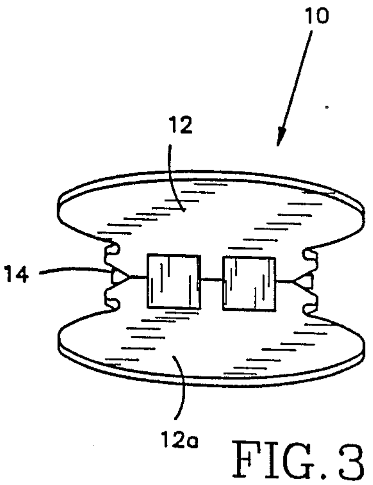
FIG. 3 is a top view of the clapper shown in FIG. 1.

In practice, the clapper 10 can be easily produced by injection molding identical clapper blades 12 and 12*a* as previously described. The blades 12 and 12*a* are first interconnected at the distal ends by interjecting hook connectors 22 and 22*a* within opposed distal openings 20*a* and 20 respectively. The blades 12 and 12*a* are orientated to laterally free each other with the shoulders 26 and 26*a* and the inverted L-shaped intermediate connecting members 32 and 32*a* being disposed inwardly. The inverted L-shaped connectors 32 and 32*a* are snapped within intermediate openings 34*a* and 34 respectively. Accordingly, the clapper 10 is ready for use to generate a clapping noise by gripping the clapper 10 in the gripping section 15 and rapidly contracting the respective clapping section 18 and 18*a* by hitting the clapper sections 18 and 18*a* together against the other hand or some other part of the body or against any object. As shown in FIGS. 1, 3 and 5 the sides of the grip portions 15 are provided with thickened edges reinforcing the said gripping portions and the free ends of the clapper blades are relatively thin and unreinforced to provide more flexible portions for clapping action.

Although specific embodiments of the invention are disclosed in the drawings and described herein, equivalent structures are contemplated, and the scope of the invention is not intended to be limited except by the appended claims.

I claim:

1. A noise generating clapper comprising: a first clapper blade and a second clapper blade, each clapper increasing in width in a linear direction from a distal connecting end through an intermediate section to the clapper end, connecting means integrally formed in the distal connecting ends of each blade, said means interconnecting the distal ends of the blades to secure one blade to the other blade, each blade has a surface facing the other blade means integrally secured to each blade to dispose the blades in a fixed laterally spaced relationship to each other, a second tapered means disposed on each of said facing surfaces and offset from each other on a distal portion of each blade adapted to abut an opposite facing surface of the other blade to fixedly space the first blade from the second blade, the clapper end of each blade being flexible and provided with a circular disc, said clapper having a fixed grip section linearly located between the distal connecting means and the intermediate section.

2. The clapper in claim 1 where each one of the blades includes a planar linear tapered shoulder interposed on an opposite side of the first blade and the second blade and to maintain lateral spacing between the first blade and the second blade within the hand gripping section of the clapper.

3. The clapper in claim 1 having intermediate connecting means comprising an engaging member secured to the first blade, the second blade containing an opening opposite the engaging member, said engaging member being adapted to fit within said opening in the second blade, and engage the structure defining the opening within the second blade.

4. The clapper in claim 3 where the intermediate connecting means further comprises a second engaging member secured to the second blade, the first blade containing an opening opposite the second engaging member, said second engaging member being adapted to fit within said opening in the first blade and engage the structure defining the opening within the second blade.

5. A method of producing a noise generating clapper, comprising:

providing a pair of identical substantially flat elongated clapper blades, each clapper blade increasing in width in a linear direction from a distal connecting end through an intermediate section to the clapper end where each blade comprises in a linear direction a distal connecting end, an intermediate section, and a clapper end, where the distal ends of each clapper blade are adapted to be interconnected and the distal end of each clapper blade contains a hook means and a distal opening, where at least one of the blades contains an intermediate connecting means, and where at least one of the blades contains an intermediate spacing means;

interconnecting the distal ends of the first blade with the distal end of the second blade by interconnecting the hook means of the first blade within the distal opening in the second blade and interconnecting the hook means of the second blade within the distal opening of the first blade to provide a pivotal connection between the first blade and the second blade;

the first blade facing the second blade and disposed in a spaced lateral relationship with the second blade;

abutting integral tapered means between the first blade and second blade to provide a clapper with laterally spaced clapper blades and providing a rigid grip portion and a flexible clapper end.

6. The method in claim 5 wherein each clapper blade contains an intermediate connecting means comprising an inverted L-shaped member, where each blade contains an adjacent intermediate opening in the blade, and the first blade and the second blade are interconnected in the respective intermediate sections by inserting the first L-shaped on the first blade within the intermediate opening in the second blade and inserting and second L-shaped opening on the second blade within the intermediate opening in the first blade.

7. The method in claim 5 wherein the elongated clapper blades are molded plastic produced by injection molding.

8. The method in claim 7 where the clapper blades are molded in an identical structural configuration.

* * * * *

UNITED STATES PATENT AND TRADEMARK OFFICE
CERTIFICATE OF CORRECTION

PATENT NO. : 4,810,228

DATED : March 7, 1989

INVENTOR(S) : Peter D. Huggins

It is certified that error appears in the above-identified patent and that said Letters Patent is hereby corrected as shown below:

Column 3, line 61 "permitting"
should read-----permitted----;

Column 4, line 43, "free"
should read----face----;

Signed and Sealed this

Fifteenth Day of August, 1989

*Attest:*

DONALD J. QUIGG

*Attesting Officer*

*Commissioner of Patents and Trademarks*